J. R. GEORGE.
METAL CUTTING SHEARS.
APPLICATION FILED MAY 25, 1910.
1,009,298.
Patented Nov. 21, 1911.
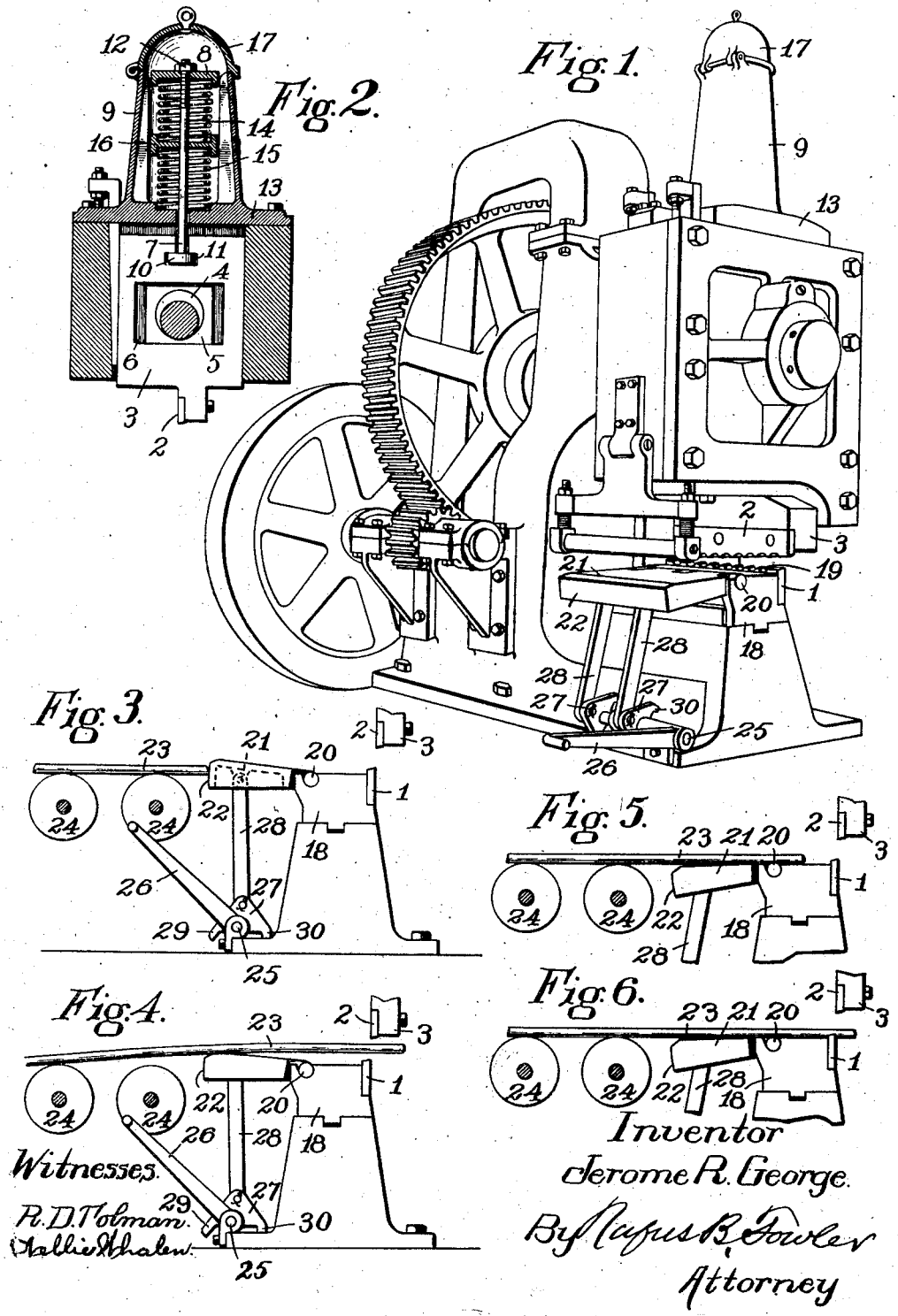

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

METAL-CUTTING SHEARS.

1,009,298.      Specification of Letters Patent.     Patented Nov. 21, 1911.

Application filed May 25, 1910. Serial No. 563,253.

*To all whom it may concern:*

Be it known that I, JEROME R. GEORGE, a citizen of the United States, residing at Worcester, in the county of Worcester and Commonwealth of Massachusetts, have invented a new and useful Improvement in Metal-Cutting Shears, of which the following is a specification, accompanied by drawings forming a part of the same.

The shear embodying my present invention belongs to that class of metal cutting shears which are designed for cutting simultaneously movable rods or bars, and it has for its objects to provide means for counteracting the weight of the reciprocating head or ram, to provide means for evening the ends of the rods to be cut and for facilitating their movement between the cutting blades. These objects are accomplished by the construction and arrangement of parts as hereinafter described and pointed out in the annexed claims.

Referring to the accompanying drawings, Figure 1 is a perspective view of a metal cutting shear embodying my invention. Fig. 2 is a sectional view showing the reciprocating ram and the means for counteracting its weight. Figs. 3 and 4 are detached front views of the mechanism for evening the rods to be cut and for lifting them into the plane between the cutting blades, Fig. 3 showing the position of the mechanism when moved for evening the rods and Fig. 4 showing its position when the rods are raised. Figs. 5 and 6 are detached front views of the mechanism for evening and lifting the rods shown in position for feeding the rods to the cutting blades, Fig. 5 showing the rods resting upon the top of the lifting mechanism and Fig. 6 showing the rods in position to be severed.

Similar reference characters refer to similar parts in the different figures.

Referring to the accompanying drawings, Fig. 1 represents a perspective view of a metal cutting shear embodying my invention, comprising a stationary cutting blade 1 attached to a fixed and rigid portion of the shear and adapted to coöperate with a movable cutting blade 2 attached to a reciprocating head or ram 3. The ram 3 is capable of movement in vertical ways in the framework of the machine as actuated by an eccentric 4 rotating in an eccentric block 5 inclosed in a recess or mortise 6 formed in the ram 3, as is usual in shears of this class.

In order to counteract the weight of the reciprocating ram 3, I connect the ram by means of a rod 7 with a disk 8 capable of a vertical sliding movement within the casing 9. The rod 7 is provided at its lower end with a head 10 which is inserted in a T-shaped slot 11 in the ram 3, and the upper end of the rod 7 is screw threaded and provided with a nut 12 bearing upon the top of the disk 8. The casing 9 is mounted upon and preferably integral with a cover 13 placed over the ways of the reciprocating ram 3. Between the cover 13 and the disk 8 I interpose a spiral spring, or, as in the present instance, two spiral springs 14 and 15 separated by a disk 16. The tension of the spiral springs 14 and 15 is sufficient to counteract the weight of the ram 3 and hold it at all times in close contact with the sliding eccentric block 5. The casing 9 is provided with a hinged cover 17 which, when removed, affords access to the interior of the casing and to the springs 14 and 15.

The stationary cutting blade 1 is attached to an anvil 18 forming part of the framework of the shear, and the cutting edge of the blade 1 projects slightly above the upper surface of the anvil. In the present instance, and when round rods are to be cut, the lower cutting blade is preferably provided with a series of semicircular notches 19 in which the rods may rest during the operation of cutting. Pivotally supported upon the anvil 18 by gudgeons 20 is an apron 21, having on its outer edge a depending flange 22. The flange 22, when the apron 21 is in its raised position, is brought into the path of the rods 23 to be severed as the latter are supported upon a series of power driven conveyer rolls 24. The presence of the flange 22 in the path of the advancing rods as they are moved forward by the conveyer rolls 24 serves to check their movement and cause the ends of the rods to be evened. When this result is accomplished, the apron is depressed, as shown in Fig. 5, allowing the conveyer rolls to move the rods simultaneously forward over the top of the apron. The apron is then again raised, which lifts the advancing ends of the rods into the plane between the cutting blades 1 and 2 and allows them to be projected forward between the cutting blades, as shown in Fig. 4, until the point at which the rods are to be severed has been reached, when the shear is brought into operation, causing the movable cutting blade 2 to descend and sever the rods. As the apron 21 is lowered with the rods in the position shown in Fig. 4, the latter will fall upon the stationary cutting blade 1 and again be moved laterally until they fit the semicircular notches 19, as shown in Fig. 6.

The elevation and depression of the apron 21 is accomplished by any known and suitable lifting mechanism, in the present instance by the use of a rocking shaft 25 journaled upon the base of the shear and carrying a lever handle 26. Attached to the rocking shaft 25 are plates 27 pivotally connected by links 28 with the apron 21, said plates 27 and links 28 forming toggle-joint connections between the shaft 25 and the apron 21. The plates 27 are preferably provided with projecting arms 29 and 30, which are arranged to contact with the base of the shear at each end of the movement of the toggle-joints and serve as stops to limit the movement of the apron 21.

I claim,

1. In a metal cutting shear, a vertically reciprocating ram, a cutting blade carried thereby, a casing mounted above said ram, a spiral spring inclosed in said casing, with its lower end held from longitudinal movement, a disk supported on the upper end of said spring, a connecting rod between said disk and said ram, with the upper end of said rod screw threaded and provided with a nut bearing on the top of said disk.

2. In a metal cutting shear, a vertically reciprocating ram, a cutting blade carried thereby, a spring with its tension applied to counteract the weight of said ram, and means for varying the tension of said spring.

3. In a metal cutting shear, a pair of cutting blades, means for feeding a metal rod to said blades, a hinged member in the path of the rod before said blades are reached, and means for raising said hinged member to contact with the advancing end of the rod and check its movement.

4. In a metal cutting shear, a pair of cutting blades, means for feeding a metal rod to said blades, rocking means in the path of said rod before said blades are reached, said means arranged in its raised position to contact with the end of said rod and in its depressed position to allow the forward movement of said rod.

5. In a metal cutting shear, a pair of cutting blades, means for feeding a metal rod thereto, a hinged apron in the path of said rod before said blades are reached, with a depending flange on said apron, and means for raising said apron to bring said flange into the path of said rod to check its forward movement.

6. In a metal cutting shear, a pair of cutting blades, means for feeding a metal rod to said blades, a rocking member in the path of said rod before said blades are reached, means for raising said rocking member to contact with the advancing end of said rod and check its movement, said member also arranged to raise the advancing end of said rod into a plane above the plane of the cutting edge of the lower blade.

7. The combination in a metal cutting shear, with a pair of upper and lower cutting blades, of means for feeding a rod to said blades, means for lifting the advancing end of the rod above the plane of the lower cutting blade, said lifting means comprising a hinged element beneath the path of the rod, a rocking shaft, and a toggle-joint connection between said shaft and said hinged element.

Dated this 20th day of May 1910.

JEROME R. GEORGE.

Witnesses:
NELLIE WHALEN,
RUFUS B. FOWLER.